(12) United States Patent
Aukland et al.

(10) Patent No.: US 12,535,175 B1
(45) Date of Patent: Jan. 27, 2026

(54) HEAT RESISTANT JOINING LINE SEAL SYSTEM

(71) Applicant: HONEYWELL INTERNATIONAL INC., Charlotte, NC (US)

(72) Inventors: Daniel Aukland, Phoenix, AZ (US); Abigail Parsons, South Bend, IN (US); Dave Dischinger, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 19/043,821

(22) Filed: Feb. 3, 2025

(51) Int. Cl.
| | |
|---|---|
| *F16L 59/14* | (2006.01) |
| *A62C 2/06* | (2006.01) |
| *B64D 33/02* | (2006.01) |
| *F02C 7/25* | (2006.01) |
| *F02C 7/28* | (2006.01) |
| *F16L 23/00* | (2006.01) |
| *F16L 23/16* | (2006.01) |
| *F16L 59/18* | (2006.01) |
| *B64D 41/00* | (2006.01) |
| *B64D 45/00* | (2006.01) |

(52) U.S. Cl.
CPC ............ *F16L 59/145* (2013.01); *A62C 2/065* (2013.01); *B64D 33/02* (2013.01); *F02C 7/25* (2013.01); *F02C 7/28* (2013.01); *F16L 23/003* (2013.01); *F16L 23/165* (2013.01); *F16L 59/184* (2013.01); *B64D 2033/0213* (2013.01); *B64D 41/00* (2013.01); *B64D 45/00* (2013.01); *B64D 2045/009* (2013.01)

(58) Field of Classification Search
CPC ..... F16L 23/003; F16L 23/165; F16L 59/145; F16L 59/184; F16L 2201/20; F16L 5/04; F16L 59/147; B64D 2045/009; B64D 33/02; A62C 3/08; A62C 2/065; F02C 7/28; F02C 7/25
USPC ........................................................ 285/187
See application file for complete search history.

(56) References Cited

U.S. PATENT DOCUMENTS

| | | | | |
|---|---|---|---|---|
| 4,058,328 | A | * 11/1977 | Nickerson | A62C 3/04 |
| | | | | 169/48 |
| 4,295,669 | A | * 10/1981 | LaPrade | F16L 59/184 |
| | | | | 285/47 |
| 5,458,343 | A | * 10/1995 | Dornfeld | F16L 5/04 |
| | | | | 277/606 |

(Continued)

FOREIGN PATENT DOCUMENTS

| | | |
|---|---|---|
| EP | 3674380 A1 | 7/2020 |
| WO | 2016135432 A1 | 9/2016 |

*Primary Examiner* — David Bochna
(74) *Attorney, Agent, or Firm* — Ingrassia, Fisher & Lorenz LLP (57) ABSTRACT

Heat resistant systems provide a self-activating insulative solution. A seal system includes a case defining a joining line where two sections of the case join together. The case envelops an internal space and separates the internal space from an external space. A seal is disposed at the joining line and a case extension defines a cavity on an outside of the seal. The case extension has an opening that extends between the cavity and the external space. A lining of a heat responsive material is provided in the case extension. The material expands to an activated state when exposed to heat above a threshold temperature and passes through the opening encapsulating the case extension and insulating the seal from the external space.

20 Claims, 4 Drawing Sheets

(56) References Cited

U.S. PATENT DOCUMENTS

| | | |
|---|---|---|
| 7,331,401 B2 | 2/2008 | Bobenhausen |
| 8,029,345 B2 | 10/2011 | Messmer et al. |
| 8,695,720 B2 | 4/2014 | Mickelsen et al. |
| 9,909,610 B2 * | 3/2018 | Mickelsen ................ F02C 7/25 |
| 2012/0227370 A1 * | 9/2012 | Mickelsen ............... A62C 3/08 |
| | | 169/45 |
| 2021/0010425 A1 * | 1/2021 | George ................. A62C 2/065 |
| 2023/0166138 A1 | 6/2023 | Tuffery et al. |

* cited by examiner

HEAT RESISTANT JOINING LINE SEAL SYSTEM

TECHNICAL FIELD

The present disclosure generally relates to heat resistant systems that protect a joining line from high temperature energy releasing events and, more specifically, to heat resistant systems for conduit joints with passive fire protection materials to inhibit heat transmission at the joints.

BACKGROUND

Various types of machinery and equipment include systems that convey gases through passages that may have joining lines or joints that may be subjected to high temperatures. One type of application involves gas turbine engines such as those used in an auxiliary power unit (APU) or other power applications. The ducts that convey gases, such as the inlet duct, plenums and the exhaust duct may be assembled from sections that are connected together at joints. These elements may be covered in heat resistant blankets or panels for insulation. High temperature heat resistant blankets may be configured as metal foil covered insulation blankets that may be engineered to encapsulate ducts and other structures.

Applications where heat insulation is desired may involve vehicles such as aircraft, where added weight may impact performance or reduce range. Blankets or panels used for heat resistance increase weight and have a relatively long lead time during product development or product changes. In addition, the blankets or panels may have joints themselves that create discontinuities.

Accordingly, it is desirable to provide heat resistant systems for machinery and equipment that effectively insulate certain areas against high temperature energy releasing events. In addition, it is preferable if such systems do not increase manufacturing complexity or mass. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

The seal systems disclosed herein provide a heat activated insulative system. In a number of embodiments, a seal system includes a case defining a joining line where two sections of the case join together. The case envelops an internal space and separates the internal space from an external space. A seal is disposed at the joining line and a case extension defines a cavity on an outside of the seal. The case extension has an opening that extends between the cavity and the external space. A lining of a heat responsive material is provided in the case extension. The material expands to an activated state when exposed to heat above a threshold temperature and passes through the opening, encapsulating the case extension and insulating the seal from the external space.

In a number of additional embodiments, a seal system includes a case defining a joint where two sections of the case join together. The case envelops an internal space and separates the internal space from an external space outside the case. A seal is disposed at the joint to seal the internal space from the external space. A case extension is disposed at the joint and defines an expansion cavity on an outside of the seal. The case extension defines a nozzle opening that extends between the expansion cavity and the external space. A lining of a heat responsive material coats an internal surface of the case extension in the expansion cavity in an unactivated state. The heat responsive material expands to an activated state when exposed to heat above a threshold temperature and passes through the nozzle opening encapsulating the case extension and insulating the seal from the external space.

In a number of other embodiments, a seal system for an auxiliary power unit of an aircraft includes a duct of the auxiliary power unit that defines a joint where two sections of the duct join together. The duct envelops an internal space and separates the internal space from an external space outside the duct. A seal is disposed at the joint to seal the internal space from the external space. An extension of the duct is disposed at the joint and defines an expansion cavity on an outside of the seal. The extension defines a nozzle opening that extends between the expansion cavity and the external space. A lining of a heat responsive material coats an internal surface of the extension in the expansion cavity in an unactivated state. The heat responsive material expands to an activated state when exposed to heat above a threshold temperature and passes through the nozzle opening encapsulating the extension and insulating the seal from the external space.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

As described herein through example systems, in the event of a high temperature energy releasing event occurring in an area of machinery or equipment where temperatures are usually lower, a self-activating seal system is provided at a joining line or joint that operates to insulate against the heat. Activation may be as a result of exposure to the heat and the response is to encapsulate the joint for protection from the heat event. For example, an intumescent material may be employed that is activated via temperature exposure causing the material to expand and create an insulative foam like protective layer.

Figure 1:
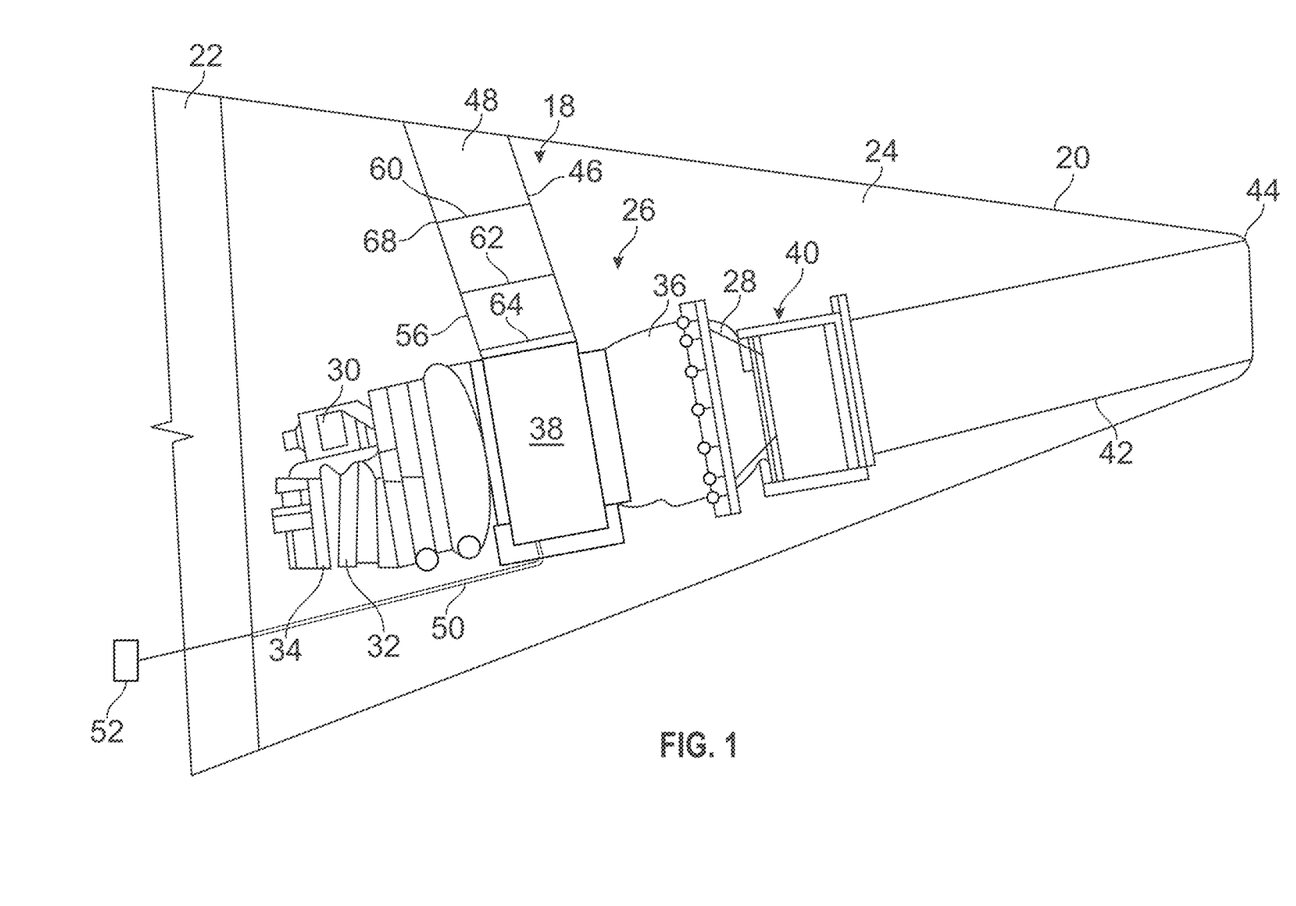
FIG. 1 is a cross-sectional illustration of a tail cone area of an aircraft including an APU with a gas turbine engine, according to an exemplary embodiment.

As noted above, the seal system 18 described herein may be employed in a variety of applications. By way of an exemplary embodiment presented for descriptive purposes, a gas turbine APU as illustrated in FIG. 1 is housed in an enclosed compartment 24 such as in the tail cone 20 area of an aircraft 22. The tail cone area 20 defines the compartment 24 that houses the APU 26. The APU 26 generally includes a turbine 28 which powers the APU 26, a starter 30 for starting the APU 26, a gearbox 32 for driving various loads including a generator 34 for supplying electrical power, a power compressor 38 for supplying air to the turbine 28, a combustor 36, a duct system 40 for pumping air, and an exhaust duct 42 for delivering exhaust out of the tail 44 of aircraft 22. The compressor 38 receives outside air from an intake duct 46 that extends between an inlet plenum 54 of the APU 26 and an inlet opening 48. The intake duct 46 may include a section 56 that may be an open duct section or that may contain a flame arrestor, a particle separator, an oil cooler, or another device.

In the current embodiment, the opening 48 is presented through the side of the tail cone 20. The inlet opening may include a door that selectively opens when the APU 26 is in operation and is closed when the APU is not in use. In addition to supplying a main flow of combustion air to the turbine 28, the compressor 38 delivers, via a bleed system, compressed air such as for pneumatic powered systems 52 of the aircraft 22 through a supply duct 50, and/or for starting other engines. Accordingly, gas in the form of air is compressed by the compressor 38 and delivered for separate uses including by the combustor 36 and by the systems 52. The air supplied to the systems 52 is referred to as bleed air, which is separated from the main flow going to the combustor 36 internally in the compressor 38. While the aspects of the seal system 18 are described herein via the application of an APU 26, it should be understood that they may be employed in any application where heat resistance or protection is desired.

The intake duct 46 and the inlet plenum 54 are collectively a part of a case 58, that defines an interior space or conduit system. The seal system 18 may be employed at any number of locations of the case 58 such as at a duct connection 60 at a joining line 68 in the intake duct 46, at a connection 62 with the section 56, and/or at a connection 64 with the inlet plenum 54. Other locations may also benefit from inclusion of the seal system 18 such as at connecting sections of the inlet plenum 54 or at penetrations thereof.

Figure 2:
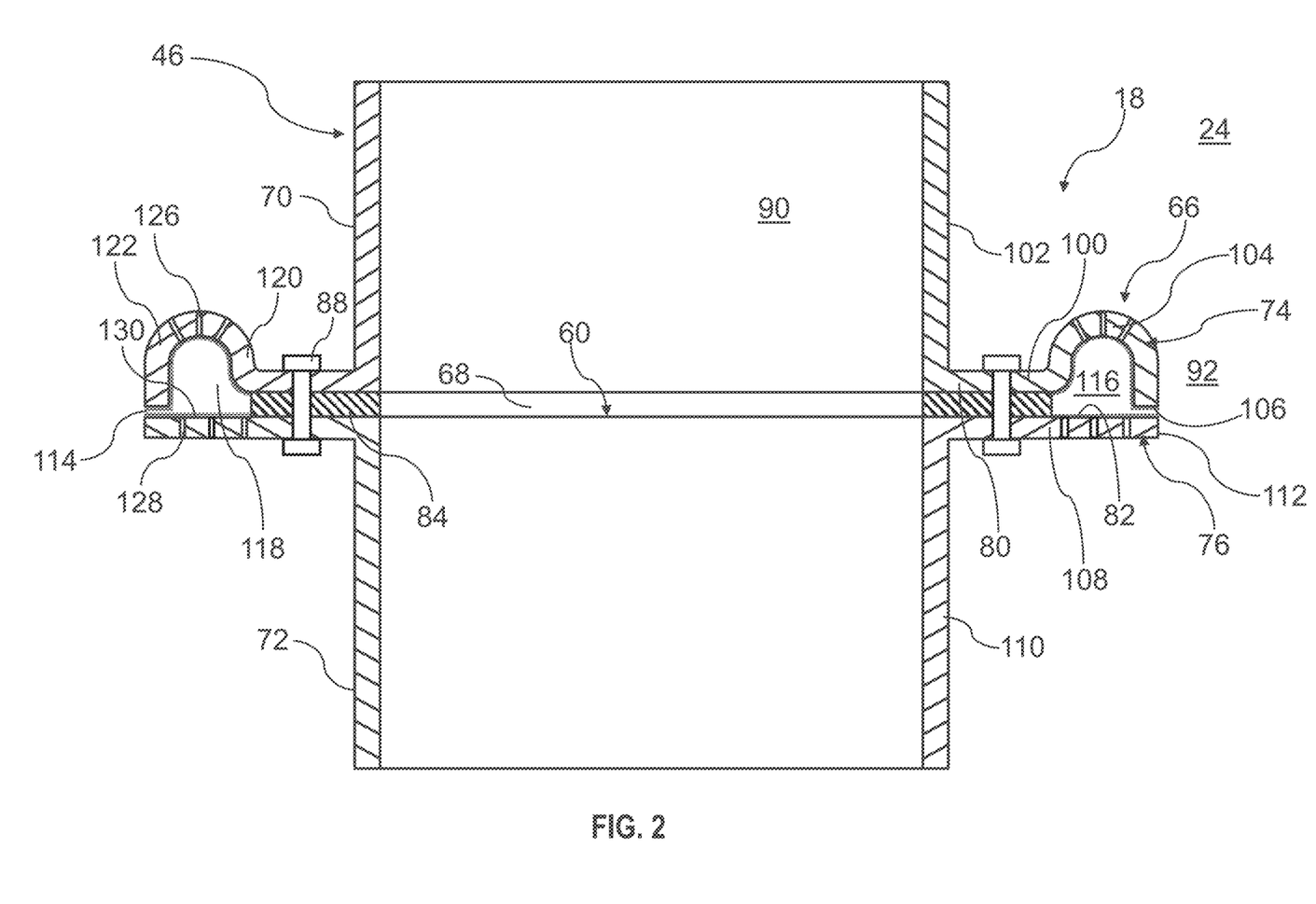
FIG. 2 is a schematic illustration of a joint area of a duct of the APU of FIG. 1 in an unactivated state, in accordance with an exemplary embodiment.

With additional reference to FIG. 2, the seal system 18 is shown applied to the duct connection 60 as an example. The connection 60 is at a location where a duct section 70 is coupled to a duct section 72 at a form of the joining line 68, which in this case is a joint of the intake duct 46. A joining line is any location in ducting or in a conduit system where two components meet, such as where there is a discontinuity in the wall of the conduit, which may be a joint, a mating connection, or at another place where two parts are connected together or at a location where one part is penetrated.

At the connection 60, the duct section 70 includes a flange 74 and the duct section 72 includes a flange 76. The flanges 74 and 76 provide a convenient mechanism to secure the duct sections 70 and 72 together and define a case extension 66. Generally, the case extension 66 projects outward from the intake duct 46. The flange 74 has a face 80 and the flange 76 has a face 82 where the faces 80 and 82 are directed (face) toward one another. In embodiments, the faces 80 and 82 may be in contact or, as shown a seal 84 is disposed between the flanges 74 and 76 contacting both the faces 80 and 82. The duct sections 70 and 72 may be made of metal, or another material, and the seal 84 may be a compressible gasket appropriate for the application, such as may be made of a silicone, polytetrafluoroethylene, ceramic fiber material, or another material to provide an effective seal. Due to the presence of the seal 84, the joining line 68 may be considered the thickness of the seal 84. The flanges 74 and 76 are coupled together, in this embodiment by fasteners 88. The fasteners 88 extend through the seal 84 and may be made of corrosion resistant (CRES) steel. In other embodiments, another means of connecting the duct sections 70 and 72 together may be used.

The intake duct 46 defines an internal space 90 which may be a form of a channel within which a gas may flow, which is separated from an exterior space 92, which may be in the compartment 24. In embodiments, the intake duct 46 is part of a conduit system that may include mechanisms for scenarios involving high temperature energy releasing events within the internal space 90, such as to contain and provide separation of such scenarios between the interior space 90 and the exterior space 92. Accordingly, the duct sections 70 and 72, such as at their flanges 74 and 76, include heat resistant features to maintain such separation.

In this embodiment, the flange 74 includes a peripheral shaped segment referred to as a ring 100 that is flat and that projects outward from the wall 102 of the duct section 70 to a point 102. From the point 102, the flange 74 includes a dome 104, which is a segment where the flange 74 curves and projects away from the flange 76. The dome then curves back toward the flange 76 to a point where the flange 74 terminates at a terminal end 106. The flange 76 includes a peripheral shaped segment referred to as a ring 108 that is flat and that projects away from the wall 110 of the duct section 72 to a terminal end 112. In other embodiments, the flange 76 may have a dome or another shape. In this example, peripheral shaped means the flanges 74, 76 or their parts extend around the perimeter of the intake duct 46 and have a similar shape to the intake duct 46 such as square, rectangular, annular, oval, etc.

The seal 84 is disposed between the faces 80 and 82 and extends along only a portion of the ring 108 beginning at the internal space 90 and extending outward. The terminal end 106 of the flange 74 is spaced from the face 82 of the flange 76 defining an opening referred to as a nozzle 114 that extends around the intake duct 46 and is directed outward therefrom. The nozzle 114 is in the shape of a slit or slot that extends around or encircles the intake duct 46. The result is that a cavity 116 is defined, which has a defined volume 118 and that is formed between the flanges 74 and 76 at a location outward from the seal 84.

The size/area of the cavity 116 has an expansion defined by parts of the dome 104 starting at the bend 120. The bend 120 begins definition of the dome 104 and further outward a contraction starts at the bend 122 and continues to the terminal end 106. The area outward from the start of the bend 120 may be referred to as a cavity area contraction. In addition to the nozzle 114, the dome 105 has a number of openings 126 that may be referred to as pressure relief vents. In addition, the ring 108 includes a number of openings 128 that may also be referred to as pressure relief vents.

The interior surfaces (facing into the cavity 116) of the dome 104 and of the ring 108 are coated with a lining 130 of a material selected to expand upon exposure to heat. For example, the lining 130 may be composed of a fire retardant material. In embodiments, the lining 130 may include an intumescent material. For example, intumescent expanding foam (IEF) may be used. IEF is a family of commercially available fire-resistant insulation materials developed to expand when exposed to heat, forming an insulating foam barrier to inhibit thermal energy transmission and effects. The material may be made of a formulation that contains a water or oil based agent combined with foaming agents, catalysts, binders and other components.

As shown in FIG. 2, the lining 103 and the seal system 18 are in a pre-activation or unactivated state. In the unactivated state, the lining 130 is a coating of the internal surfaces of the case extension in the cavity 116 and fills only a portion of the cavity 116. The material of the lining 130 may be generally referred to as a heat responsive material and is configured to expand when exposed to heat above a threshold temperature. The threshold temperature may be determined to suit the application and the material formulation may be tailored for that threshold temperature.

Figure 3:
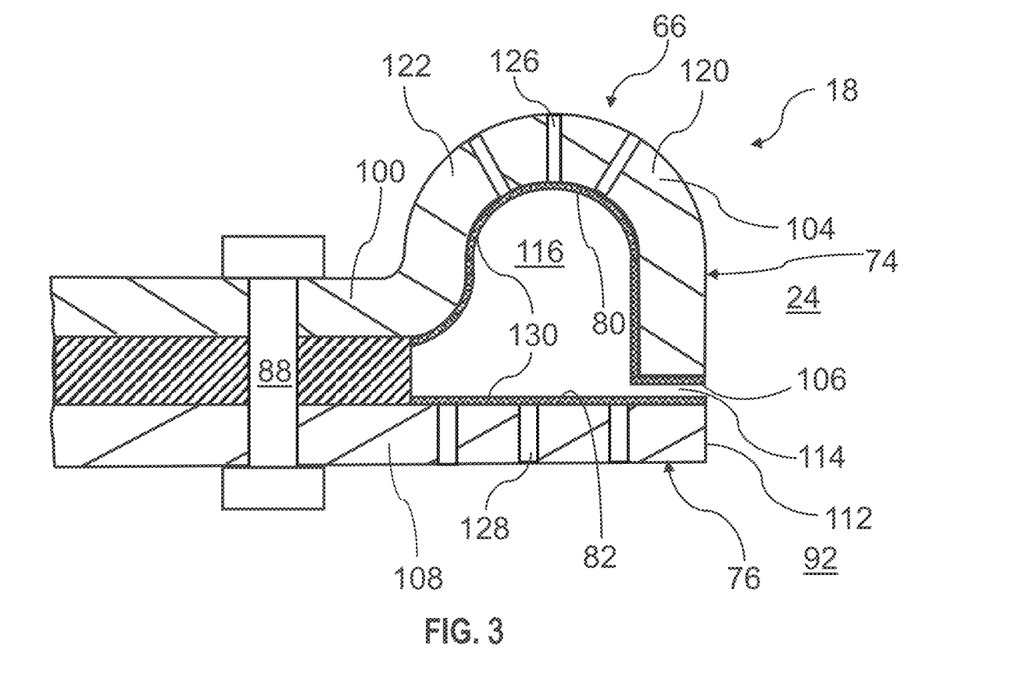
FIG. 3 is a schematic illustration of part of the joint area of FIG. 2 enlarged to show the lining locations, in accordance with an exemplary embodiment.

FIG. 3 includes an enlarged view to show the locations of the lining 130. In this embodiment, the lining 130, such as of an IEF, is included on the surfaces of the flanges 74 and 76 that face into the cavity 116 on the faces 80 and 82. The lining 130 is also included on the surfaces of the flanges 74 and 76 facing into the nozzle 114. This includes the inside surfaces at the dome 120, the surface at the terminal end 106, and the surface along the ring 108 between the seal 84 and the terminal end 112. The lining 130 is not included on the seal 84. The lining 130 may be applied before the parts are assembled. Locating the lining 130 within the cavity 116 and the nozzle 114 provides the benefit of protecting the heat responsive material. For example, prior to deployment the lining 130 is not exposed and is protected from damage such as from being dislodged/scraped off during normal installation, operation, handling and maintenance of the intake duct 46.

Figure 4:
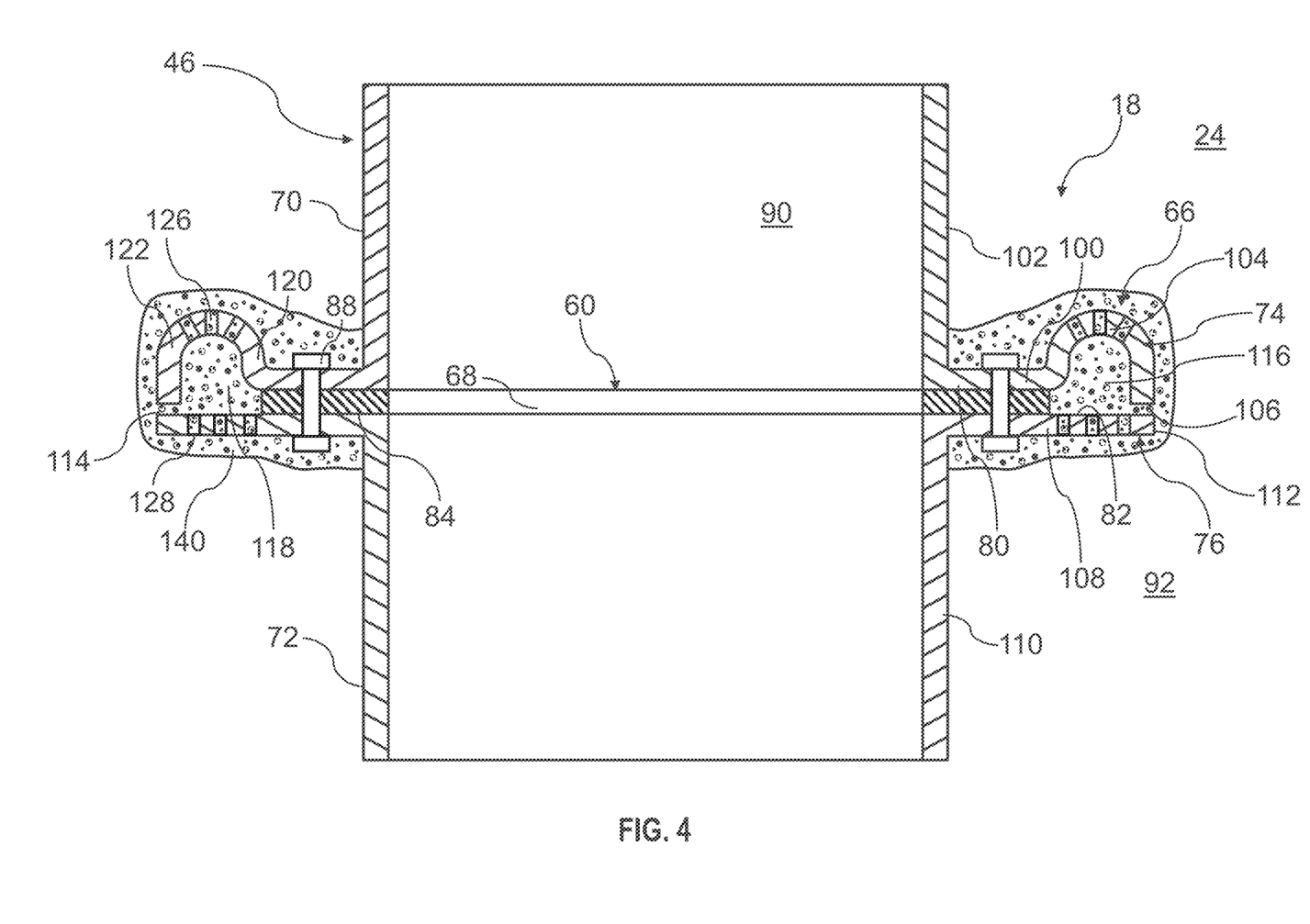
FIG. 4 is a schematic illustration of the joint area of a duct of the APU of FIG. 1 in an activated state, in accordance with an exemplary embodiment.

Referring to FIG. 4, the seal system 18 is illustrated in an activated state. In this state, the presence of heat or of a heat releasing event has occurred at the duct connection 60. The lining 130 has expanded and as a result, has filled the cavity 116 and moved out, primarily through the nozzle 114 by which it is directed around the outside of the dome 104 and of the rings 100 and 108. Because the cavity 116 has room for expansion of the material of the lining 130, it may be referred to as an expansion cavity. As a result of the activated lining 130, the flanges 74 and 76 and the connection 60 are encapsulated in a coating 140 of the IEF that previously existed as the lining 130. Additional material may pass through, or be directed by, the openings 126 and 128. For example, while the opening 126 and 128 provide pressure relief, they may also be designed to tailor the path of the expanding IEF. Upon full activation, the coating 140 completely surrounds the connection 60, including the case extension 66, providing a thermal barrier that insulates the seal 84 from the external space. The result is that the connection 60 is encapsulated in the coating 140, such as of the IEF, and the seal 84 is protected. The expanded lining 130, now comprising the coating 140, also fills the cavity 116, the nozzle 114 and the openings 126 and 128. Flow of the material of the lining 130 to the coating 140 state is directed by the nozzle 114 and the openings 126, 128. The openings 126 and 128 act as vents to relieve pressure and act to direct flow of IEF material (of the lining 130) out of the cavity 116 to fully encapsulate the flanges 74 and 76, insulating the seal 84 from exterior space 92.

Accordingly, a heat resistant joining line sealing system includes a flanged joint with a compressible gasket, fasteners, and an intumescent or fire-retardant coating. The compressible gasket is disposed in a flanged connection which has an inner volume or cavity that is coated or painted with the intumescent material. The compressible gasket is recessed into the flanged connection. The defined inner volume or cavity outward from the seal is left mostly void during the pre-activation state of the intumescent material.

The expansion volume or cavity in the flanged connection has an area contraction leading to the nozzle exit and the cavity has pressure relief openings. The intumescent material is activated via temperature, which then causes the coating to expand and create an insulative foam like protective layer. In the event of elevated heat at the flanged connection, the selected material activates and expands filling the cavity. The area contraction leading to the nozzle forces the expanding foam out of the cavity and around both flanged halves creating the protective layer. The pressure relief holes may be designed so that the rapid expansion of the intumescent upon activation does not create enough force to separate the flange. The system provides an insulative protection and avoids the need for insulative blankets and their space and weight.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A seal system comprising:
a case defining a joining line where two sections of the case join together, the case enveloping an internal space inside the case and separating the internal space from an external space outside the case;
a seal disposed at the joining line to seal the internal space from the external space;
a case extension disposed at the joining line and defining a cavity on an outside of the seal, the case extension defining an opening that extends between the cavity and the external space; and
a lining of a heat responsive material is disposed in the case extension and facing into the cavity,
wherein the heat responsive material is configured to expand to an activated state when exposed to heat above a threshold temperature and to pass through the opening thereby encapsulating the case extension and insulating the seal from the external space.

2. The seal system of claim 1, wherein the opening comprises a nozzle configured to direct a flow of the heat responsive material around the case extension when activated.

3. The seal system of claim 1, wherein the case includes a first section and a second section connected to the first section at the joining line, and comprising a first flange included on the first section and a second flange included on the second section, wherein the cavity is defined between the first flange and the second flange.

4. The seal system of claim 1, wherein the case extension includes a number of vent openings configured to relieve pressure when the heat responsive material expands, and configured to direct flow of the heat responsive material out of the cavity to fully encapsulate the joining line, insulating the seal from the external space.

5. The seal system of claim 1, wherein the case includes a first section and a second section connected with the first section at the joining line, and comprising a first flange included on the first section and a second flange included on the second section, wherein the first flange includes a dome defining, in combination with the second flange, the cavity.

6. The seal system of claim 1, wherein the heat responsive material comprises an intumescent expanding foam.

7. The seal system of claim 1, wherein the cavity has a contraction formed by a bend and leading to the opening to direct the heat responsive material upon expansion.

8. The seal system of claim 1, wherein the lining, in an unactivated state, fills only a portion of the cavity.

9. The seal system of claim 1, wherein the case includes a first section and a second section connected to the first section at the joining line, and comprising a first flange included on the first section and a second flange included on the second section, wherein when in the activated state, the heat responsive material encapsulates the first flange and the second flange providing a coating on an outside of the case extension at the cavity.

10. The seal system of claim 1, wherein the case comprises an intake duct of an auxiliary power unit of an aircraft.

11. A seal system comprising:
a case defining a joint where two sections of the case join together, the case enveloping an internal space inside the case and separating the internal space from an external space outside the case;
a seal disposed at the joint to seal the internal space from the external space;
a case extension disposed at the joint and defining an expansion cavity on an outside of the seal, the case extension defining a nozzle opening that extends between the expansion cavity and the external space; and
a lining of a heat responsive material coating an internal surface of the case extension in the expansion cavity in an unactivated state,
wherein the heat responsive material is configured to expand to an activated state when exposed to heat above a threshold temperature and to pass through the nozzle opening encapsulating the case extension and insulating the seal from the external space.

12. The seal system of claim 11, wherein the nozzle opening opens in a direction directed away from the case and is configured to direct a flow of the heat responsive material around the case extension.

13. The seal system of claim 11, wherein the case includes a first duct section and a second duct section connected to the first duct section at the joint, and comprising a first flange included on the first duct section and a second flange included on the second duct section, wherein the seal is compressed between the first flange and the second flange, and wherein the expansion cavity is defined between the first flange and the second flange.

14. The seal system of claim 11, wherein the case includes a first section and a second section connected to the first section at the joint, and comprising a first flange included on the first section and a second flange included on the second section, wherein the case extension includes a first number of vent openings in the first flange and a second number of vent openings in the second flange, the first and second vent openings configured to relieve pressure when the heat responsive material expands.

15. The seal system of claim 11, wherein the case includes a first section and a second section connected to the first section at the joint, and comprising a first flange included on the first section and a second flange included on the second section, wherein the first flange includes a dome and the second flange includes a ring section, the dome and the ring section defining, in combination, the expansion cavity.

16. The seal system of claim 11, wherein the heat responsive material comprises an intumescent expanding foam material configured to expand when exposed to heat, to form an insulating foam barrier.

17. The seal system of claim 11, wherein the expansion cavity has a dome that defines a contraction formed by a bend and leading to the opening to direct the heat responsive material upon expansion.

18. The seal system of claim 11, wherein the lining, in an unactivated state, comprises a coating on an internal surface of the case extension and fills only a portion of the expansion cavity.

19. The seal system of claim 11, wherein the case includes a first section and a second section connected to the first section at the joint, and comprising a first flange included on the first section and a second flange included on the second section, wherein when in the activated state, the heat responsive material encapsulates an exterior of the first flange and the second flange providing a coating on an outside of the joint at the expansion cavity.

20. A seal system for an auxiliary power unit of an aircraft, the seal system comprising:
   a duct of the auxiliary power unit defining a joint where two sections of the duct join together, the duct enveloping an internal space inside the duct and separating the internal space from an external space outside the duct;
   a seal disposed at the joint to seal the internal space from the external space;
   an extension of the duct disposed at the joint and defining an expansion cavity on an outside of the seal, the extension defining a nozzle opening that extends between the expansion cavity and the external space; and
   a lining of a heat responsive material coating an internal surface of the extension in the expansion cavity in an unactivated state,
   wherein the heat responsive material is configured to expand to an activated state when exposed to heat above a threshold temperature and to pass through the nozzle opening encapsulating the extension and insulating the seal from the external space.

* * * * *